United States Patent
Mizuno

(10) Patent No.: US 9,195,410 B2
(45) Date of Patent: Nov. 24, 2015

(54) STORAGE SYSTEM AND ACCESS ARBITRATION METHOD

(71) Applicant: Hitachi, Ltd., Tokyo (JP)

(72) Inventor: Makio Mizuno, Sagamihara (JP)

(73) Assignee: HITACHI, LTD., Tokyo (JP)

( * ) Notice: Subject to any disclaimer, the term of this patent is extended or adjusted under 35 U.S.C. 154(b) by 275 days.

(21) Appl. No.: 13/697,900

(22) PCT Filed: Oct. 31, 2012

(86) PCT No.: PCT/JP2012/006993
§ 371 (c)(1),
(2) Date: Dec. 19, 2012

(87) PCT Pub. No.: WO2014/068620
PCT Pub. Date: May 8, 2014

(65) Prior Publication Data
US 2014/0122792 A1    May 1, 2014

(51) Int. Cl.
*G06F 21/83* (2013.01)
*G06F 13/18* (2006.01)
*G06F 3/06* (2006.01)

(52) U.S. Cl.
CPC .............. *G06F 3/0676* (2013.01); *G06F 3/067* (2013.01); *G06F 3/0611* (2013.01); *G06F 3/0613* (2013.01); *G06F 3/0656* (2013.01); *G06F 3/0659* (2013.01)

(58) Field of Classification Search
CPC ... G06F 11/201; G06F 17/302; G06F 3/0635; G06F 3/067; G06F 3/0656; G06F 3/061; G06F 3/0659; G06F 3/0689; G06F 12/0866; G06F 13/161; G06F 3/0676
See application file for complete search history.

(56) References Cited

U.S. PATENT DOCUMENTS

| | | | |
|---|---|---|---|
| 5,058,133 A * | 10/1991 | Duncanson et al. | 375/260 |
| 5,608,892 A * | 3/1997 | Wakerly | 711/118 |
| 6,393,519 B1 | 5/2002 | Fujimoto et al. | |
| 6,438,629 B1 * | 8/2002 | Huebner et al. | 710/52 |
| 6,877,061 B2 * | 4/2005 | Thibault et al. | 710/312 |
| 7,062,620 B1 * | 6/2006 | Bisbee et al. | 711/162 |
| 2004/0250026 A1 * | 12/2004 | Tanoue | 711/151 |
| 2008/0140945 A1 | 6/2008 | Salessi et al. | |
| 2008/0263273 A1 * | 10/2008 | Matsumoto et al. | 711/112 |

(Continued)

FOREIGN PATENT DOCUMENTS

| | | |
|---|---|---|
| JP | 05-120113 A | 5/1993 |
| JP | 2000-010901 A | 1/2000 |

(Continued)

*Primary Examiner* — Cheng-Yuan Tseng
*Assistant Examiner* — Candice Rankin
(74) *Attorney, Agent, or Firm* — Volpe and Koenig, P.C.

(57) ABSTRACT

According to the prior art, when requesters having different I/O access processing abilities compete when accessing a target, latency is extended via accesses from a requester having a lower I/O access performance, according to which the number of I/Os issued per unit time (data processing quantity) cannot be increased, and the processing performance of the system cannot be improved. According to the present invention, when requesters compete in accessing a target, the request having a lower requester performance (having a longer processing time per single I/O) is processed (started) in a prioritized manner. Thereby, the number of I/O processes per unit time can be increased, and the processing performance of the whole storage system can be improved.

11 Claims, 16 Drawing Sheets

(56) References Cited

U.S. PATENT DOCUMENTS

2010/0274935 A1* 10/2010 Hirayama ................. 710/38
2011/0185114 A1* 7/2011 Bolanowski ............... 711/103

FOREIGN PATENT DOCUMENTS

| JP | 2001-331363 A | 11/2001 |
| JP | 2010-079536 A | 4/2010 |

* cited by examiner

| Start Address | Data Length |
|---|---|
| 0x10000000 | 65536 |
| 0x20000000 | 8192 |
| 0x30000000 | 8192 |
| . . . . . | |
| 0x40000000 | 65536 |

1510 1520 1500

STORAGE SYSTEM AND ACCESS ARBITRATION METHOD

TECHNICAL FIELD

The present invention relates to a storage system and an access arbitration method.

BACKGROUND ART

Recently, demands are increasing for the further improvement of processing performance of storage systems, along with the enhancement of processing performance of processors and the advancement of data transmission technology. In order to improve the processing performance of the storage system, it is necessary to adopt the latest component technology, to enhance processors and other components, and to improve the processing efficiency of data transfer that occurs within the storage system.

On the other hand, in order to follow the cost reduction advancing throughout the whole storage system market, approaches are made to adopt the latest component technology and the enhancement of components, but such approaches for enhancing the processing performance lead to increased costs, it is difficult to follow market trends. In order to realize both low costs and enhanced processing performance of storage systems, it is effective to improve the processing efficiency of data transfer.

Patent literature 1 discloses an art for enhancing the processing efficiency of data transfer in a storage system. This patent literature teaches efficient use of channel access paths among channel I/F units, disk I/F units and shared memory units or cache memory units, according to which the memory access throughput, especially the access throughput to the cache memory, is improved.

CITATION LIST

Patent Literature

PTL 1: Japanese Patent Application Laid-Open Publication No. 2000-10901 (U.S. Pat. No. 6,393,519)
PTL 2: Japanese Patent Application Laid-Open Publication No. H5-120113
PTL 3: Japanese Patent Application Laid-Open Publication No. 2001-331363
PTL 4: Japanese Patent Application Laid-Open Publication No. 2010-79536

SUMMARY OF INVENTION

Technical Problem

Patent literature 1 discloses a disk array controller capable of having a high memory access throughput. Actually, the disk array controller is provided which comprises one or more interface units to a host computer, one or more interface units to a plurality of disk drives, and one or more physically independent shared memory units for storing control information on data in the disk drives and on the disk array controller, wherein the interface units to the host computer and the interface units to the disk drives can access the shared memory units via a selector, and access paths are connected between the selector and the interface units to the host computer and to the disk drives and between the selector and the shared memory units.

The selector unit of the disk array controller includes a unit for connecting a plurality of input ports from the interface units connected to the host computer or the disk drives to a plurality of output ports to the shared memory units, a unit for storing connection requests from input ports to output ports in an arrival order of the connection requests, and an arbiter unit for arbitrating a plurality of connection requests and assigning an output port to a connection request from an input port.

Further, the arbiter unit assigns, if a first connection request among the connection requests stored in the arrival order is a connection request to a vacant output port, the output port to the connection request, checks a second connection request, if the first connection request among the connection requests stored in the arrival order is a connection request to an occupied output port, and assigns, if the second connection request is a connection request to a vacant output port, the output port to the second connection request, checks a third connection request, if the second connection request is a connection request to an occupied output port, and thereafter repeats an arbitration (assignment) of an output port to a connection request at the most by several times equal to the number of vacant output ports.

Within the disk array controller, data transfer is largely classified into a data transfer that directly influences the device performance and a data transfer having no direct influence. However, according to the system for enhancing the memory access throughput according to patent literature 1, a vacant port is assigned uniformly regardless of whether the transfer influences the performance of the device or not. In other words, the request to a vacant port is assigned even if the request does not have direct influence on the performance of the device, so that the request having direct influence on the performance of the device is put on hold, according to which the performance of the device is deteriorated.

Patent literature 2 discloses a system for enhancing the throughput of a read request. Actually, the system for enhancing the throughput of a read request taught in patent literature 2 includes a first means for selecting a read request that has been received later over an unprocessed write request having been received earlier, a second means for comparing the addresses of the requests, and a third means for executing a read operation when the compared addresses do not correspond and for executing a write operation with respect to a storage unit when the addresses correspond, wherein if there is no unprocessed write request that has been received earlier when selecting the read request, the third means immediately starts the read operation with respect to the storage unit.

The art taught in patent literature 2 is effective in a case where a read request arrives immediately after a write request, but if a read request is received after a certain time has elapsed after completing the write request, the effect mentioned above cannot be achieved by simply comparing addresses.

Further, the completion of a write request means that the write data related to the write request is already stored in the storage unit, so that it is not possible to respond immediately to a read request, and as a result, accesses to the storage unit occur and throughput cannot be enhanced.

Patent literature 3 teaches a system of controlling the order of requests that can be processed quickly while ensuring the order of read requests and write requests. Actually, a request order control unit for outputting read requests and write requests entered through the system of controlling the order of requests according to patent literature 3 includes a read request storage means for storing the entered read requests, a write request storage means for storing the entered write requests, a first address correspondence detect means for detecting whether the address designated by the read request corresponds to the address designated by the stored write request, and a read/write issue order control means for reading the read request stored earliest in the read request storage means or the write request stored earliest in the write request storage means based on the result of the first address correspondence detect means and outputting the same to a memory.

However, if the write requests are completed, there is no request remaining in a request buffer, so the technique taught in patent literature 3 will not function effectively. In addition, according to the technique taught in patent literature 3, the taught technique will not function effectively depending on the access unit of the read request or the write request.

For example, it is assumed that a read request accesses the memory in 2 KB units (granularities) and a write request accesses the memory in 512 B units, wherein a read request or a write request targeting 2 KB of data is considered to be issued. For convenience, the address designated in both requests is address 0. Since the read request reads 2 KB of data from the memory, the read request will be a 2-KB read request starting from address 0. Since the write request writes 2-KB of data, the write request will be a 512 B write request starting from start address 0, address 512, address 1024 and address 1536.

In this case, since the addresses correspond at start address 0, the write request of 512 B to address 0 is processed before processing the read request of 2 KB to address 0, but at this time, since the data of address 512 and thereafter are not yet written, the data read via the 2-KB read request to address 0 is not complete, so that the requester may consider the data as error.

Patent literature 4 teaches a system for improving the efficiency of memory access. Actually, in the system for enhancing the efficiency of memory access taught in patent literature 4, a request management table unit, a read request output determination and latch unit, a write request reception determination and latch unit, and a table entry invalidating unit described below are provided within a memory access control unit. The request management table unit stores the read request information or the write request information requested by a data processing unit.

Further, when a read request information is requested from the data processing unit, if an effective write request information designating a same destination memory area as the destination memory area designated by the read request information is stored in the request management table unit, the read request output determination and latch unit receives the read request information and stores the same in a non-issued state to the request management table unit. Further, if an effective write request information designating the same destination memory area as the destination memory area designated by the read request information is not stored in the request management table unit, the read request information is issued to a memory controller within the memory device and the read request information is also stored in the request management table unit.

If a write request information is requested from the data processing unit, if an effective read request information designating a same destination memory area as the destination memory area designated by the write request is not stored in the request management table unit, the write request reception determination and latch unit stores the write request information in the request management table unit.

The table entry invalidating unit receives a memory write completion signal indicating completion of write access from the memory controller within the memory device to a memory device via write request information (RAM write completion signal) or a read data reception signal indicating completion of read access to the memory device based on a read request information, invalidates or deletes the read request information or the write request information stored in the request management table unit corresponding to the read data reception signal, and when the invalidated or deleted table entry is the write request information, a table entry of an unissued read request information having the same address memory area as the write request information is searched from the request management table unit, and orders to issue a read request information corresponding to the searched table entry to the read request output determination and latch unit.

However, if a write request or a read request is completed, the corresponding request information is either deleted from or invalidated in the request management table unit and no longer remains, so that the technique taught in patent literature 4 cannot function effectively.

In the above-described access arbitration control method, when requesters having different I/O access processing abilities compete in accessing a target, the requester having a lower I/O access performance, that is, the requester having a slower access performance, becomes the bottleneck of the performance of the system. In other words, the access performed by a requester having a low I/O access performance causes the latency (response time) to be elongated, according to which the number of I/Os issued per unit time (data processing quantity) cannot be increased, and the processing performance of the system cannot be improved.

Solution to Problem

In order to solve the problems mentioned above, when requesters accessing a target compete with one another, the requester having a low processing ability (longer processing time per one I/O) or a requester having a low operation rate is started with priority and processed first.

Advantageous Effects of Invention

According to the present invention, the number of I/O processes per unit time can be increased, and the processing ability of the whole storage system can be improved. The other problems, configurations and effects of the present invention will become apparent from the following detailed description of preferred embodiments.

DESCRIPTION OF EMBODIMENTS

Figure 1:
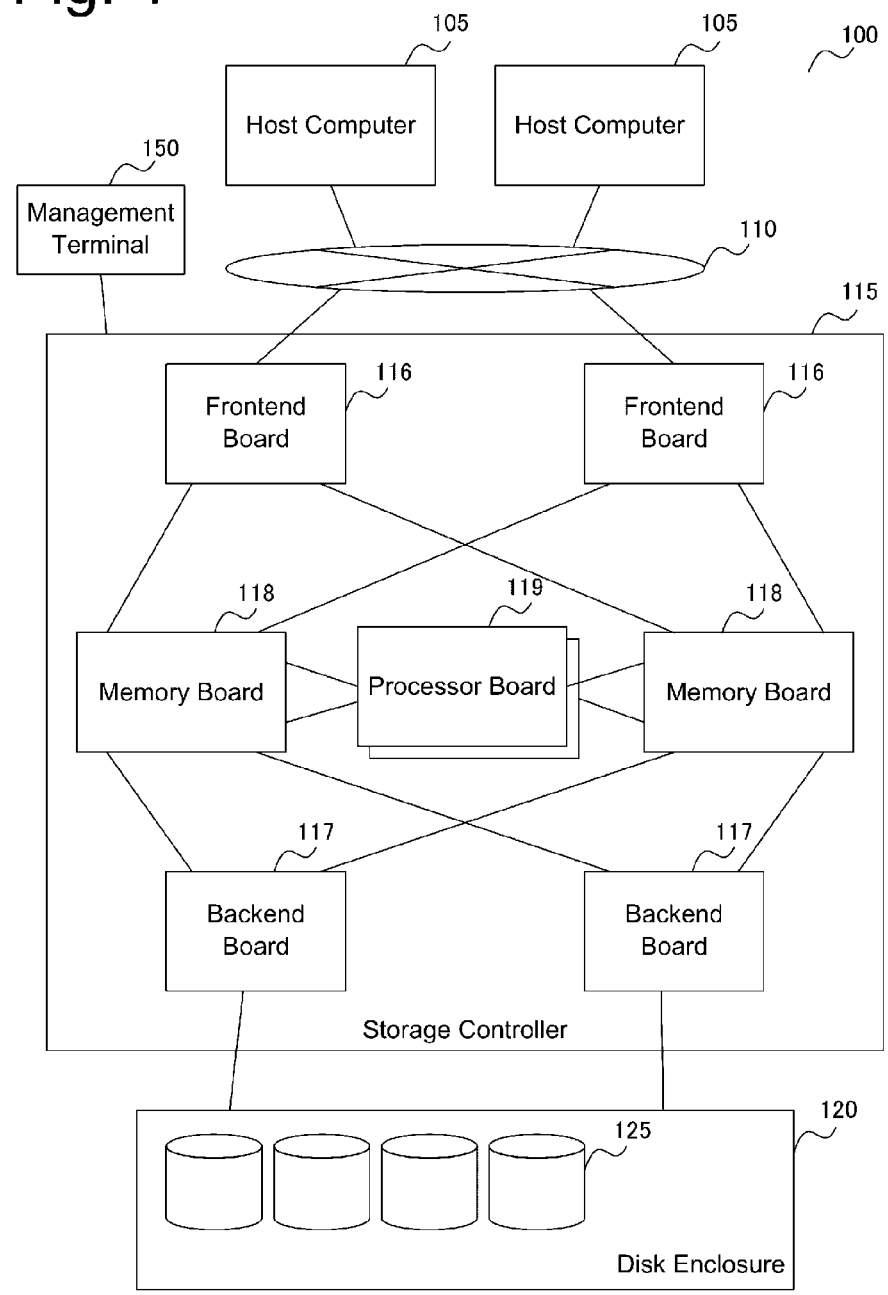
FIG. 1 is a block diagram illustrating a configuration of a storage system according to a first embodiment of the present invention.

Now, the preferred embodiments of the present invention will be described with reference to the drawings. In the following description, various information are referred to as "management table" and the like, but the various information can be expressed by data structures other than tables. Further, the "management table" can also be referred to as "management information" to indicate that the information does not depend on the data structure.

The processes are sometimes described using the term "program" as the subject. The program is executed by a processor such as a CPU (Central Processing Unit) for performing determined processes. A processor can also be the subject of the processes since the processes are performed using appropriate storage resources (such as memories) and communication interface devices (such as communication ports). The processor can also use dedicated hardware in addition to the CPU. The computer program can be installed to each computer from a program source. The program source can be provided via a program distribution server or a storage media, for example.

Each element can be identified via numbers, but other types of identification information such as names can be used as long as they are identifiable information. The equivalent elements are denoted with the same reference numbers in the drawings and the description of the present invention, but the present invention is not restricted to the present embodiments, and other modified examples in conformity with the idea of the present invention are included in the technical range of the present invention. The number of each component can be one or more than one unless defined otherwise.

Embodiment 1

The present example illustrates a preferred embodiment of the method for enhancing performance of a storage system by optimizing the arbitration of accesses. Now, the preferred embodiment of the present invention will be described in detail with reference to the drawings.

FIG. 1 is an example of a storage system to which the present invention is applied, and a computer system including the storage system. The computer system 100 includes a host computer 105 for performing data processing and computation, a storage controller 115, a disk enclosure 120, and a management terminal 150 managing the storage system. The disk enclosure 120 has the storage devices (disks) 125. There can be multiple storage controllers 115 and/or disk enclosures 120. The storage controller 115 and the disk enclosure 120 as a set is called a storage system.

Generally, in a SAN (Storage Area Network), the host computer 105 and the storage controller 115 are coupled by a Fibre Channel or an Ethernet (Registered Trademark) and the like via a network 110 composed of a switch or the like not shown.

The host computer 105 sends a data write request or a data read request to the storage controller 115.

When a read request is received from the host computer 105, the storage controller 115 reads the data related to the read request from the disk enclosure 120 and sends the read data to the host computer 105. When a write request is received from the host computer 105, the storage controller 115 writes the data related to the write request to the disk enclosure 120.

Two or more disks 125 are mounted in the disk enclosure 120. The disk 125 can be a hard disk drive (HDD), or a SSD (Solid State Drive) mounting a nonvolatile memory such as a flash memory. The disk 125 stores the data sent from the host computer 105. At this time, by performing data redundancy by the plurality of disks via RAID operation or the like, it becomes possible to prevent data loss when failure occurs to the disks.

The storage controller 115 is equipped with a frontend board 116, a backend board 117, a memory board 118 and a processor board 119. There are two of each type of boards, but the number can be one, or more than three.

The frontend board 116 is equipped with an interface connected to the host computer 105. The frontend board 116 performs the packet received from the host computer 105 to protocol processing. Actually, the frontend board 116 executes protocol processing to specify the storage location of the received packet in the disk enclosure 120, the capacity of the received packet, and the command included in the received packet, and converts the received packet to a form storable to the disk enclosure 120.

The frontend board 116 performs the packet to be sent to the host computer 105 to protocol processing. Actually, the frontend board 116 adds to the read data an identification data of the host computer 105 as the transmission destination and the control data related to the command sent to the host computer 105 as the transmission destination and the like based on the communication protocol between the storage controller 115 and the host computer 105, and creates a packet that can be transmitted to the host computer 105.

The backend board 117 is equipped with an interface connected to the disk enclosure 120. The backend board 117 is equipped with the same function as the frontend board 116. Actually, the backend board 117 performs the packet received from the disk enclosure 120 to protocol processing. Further, the backend board 117 converts the packet to a form storable to the disk enclosure 120.

The memory board 118 comprises a cache memory area for temporarily storing the data communicated with the host computer 105, and a system area for storing the control data, the configuration data, the directory data and the like of the storage system.

The processor board 119 controls various components within the storage controller 115, such as the frontend board 116 and the backend board 117. For example, it sets up a data transfer parameter of the frontend board 116 and the backend board 117. Further, the processor board 119 monitors failure of the storage system, and when failure is detected, a process corresponding to the failure is executed.

Figure 2:
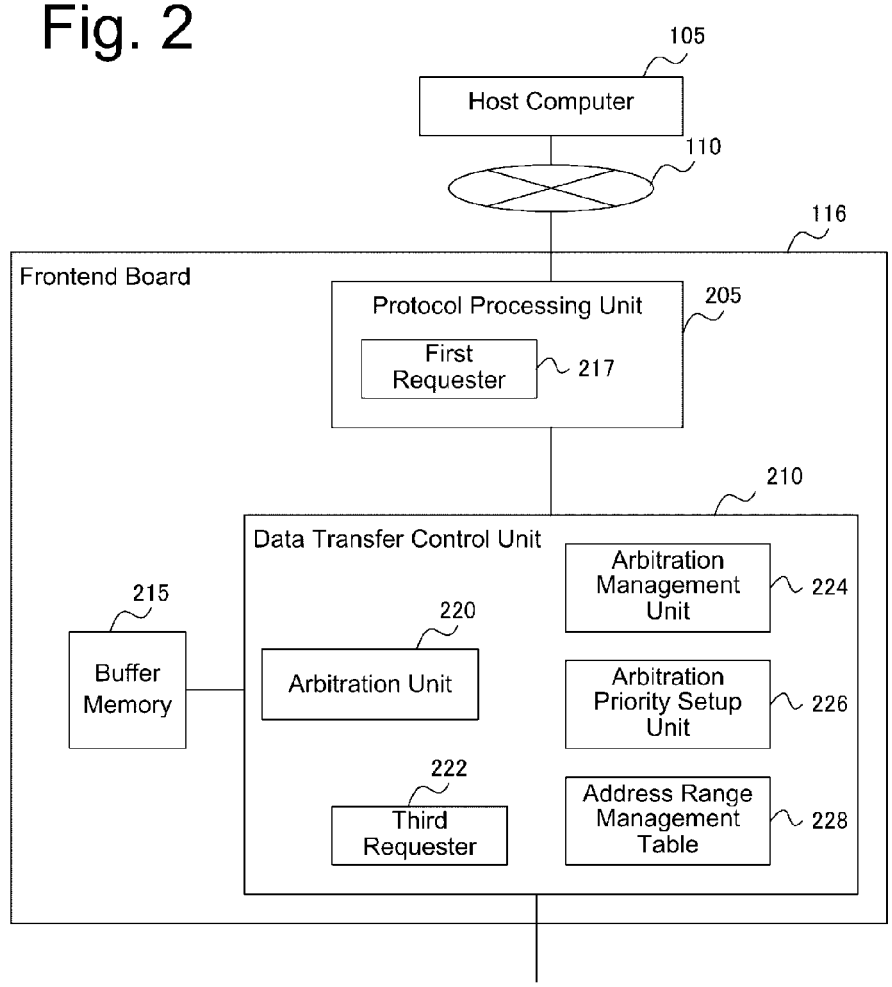
FIG. 2 is a block diagram showing a configuration of a frontend board according to the first embodiment of the present invention.

FIG. 2 is a block diagram showing a configuration of a frontend board according to the first embodiment. The details of the frontend board 116 will be described with reference to FIG. 2.

The frontend board 116 includes a protocol processing unit 205, a data transfer control unit 210 and a buffer memory 215.

The protocol processing unit 205 converts the protocol used for the communication between the host computer 105 and the storage controller 115 to a protocol used within the storage controller 115.

The protocol used for the communication between the host computer 105 and the storage controller 115 can be a Fibre Channel (FC), and a recently adopted Fibre Channel over Ethernet (FCoE) for transmitting FC via an Ethernet (Registered Trademark).

The storage controller 115 is composed of a plurality of boards, for example, as shown in FIG. 1, and the board is often composed of a plurality of components, as shown in FIG. 2. Therefore, the protocol used within the storage controller 115 should preferably be suitable for enabling communication among multiple boards or for communication among components on the board, which include a PCI-Express (Registered Trademark) and a Rapid-IO (Registered Trademark) which are computer bus standards.

The protocol processing unit 205 further comprises a first requester 217. The first requester 217 transfers the data from the host computer 105 to the buffer memory 215, or reads the data for the read request from the host computer 105 from the buffer memory 215.

The data transfer control unit 210 can transfer the data requested to the write request from the host computer 105 to the memory board 118, or read from the memory board 118 the data requested to the read request from the host computer 105 and transfer the same to the buffer memory 215.

The data transfer control unit 210 further comprises an arbitration unit 220, a third requester 222, an arbitration management unit 224, an arbitration priority setup unit 226, and an address range management table 228.

The arbitration unit 220 arbitrates the accesses of the first requester 217 and the third requester 222 to the buffer memory 215.

The third requester 222 executes data transfer between the buffer memory 215 and the memory board 118. The third requester 222 stores the data stored in the buffer memory 215 to a given area in the memory board based on the data transfer parameter transferred from a processor 3210 (FIG. 15) on the processor board 119. Further, the third requester 222 reads the data stored in the cache memory area of the memory board 118 based on the data transfer parameter, and stores the same in the given area of the buffer memory 215. One actual example of a configuration element of the third requester 222 is a DMA engine (DMA controller).

The arbitration management unit 224 controls the order of accesses of the first requester 217 and the third requester 222 based on the contents of the address range management table 228.

The arbitration priority setup unit 226 sets up a requester to be prioritized with respect to the arbitration unit 220 based on the contents of arbitration setup received from the control program.

The address range management table 228 records an access destination start address and an access data length of data transfer performed with respect to the buffer memory 215. The details of this process will be described with reference to FIG. 14.

Figure 3:
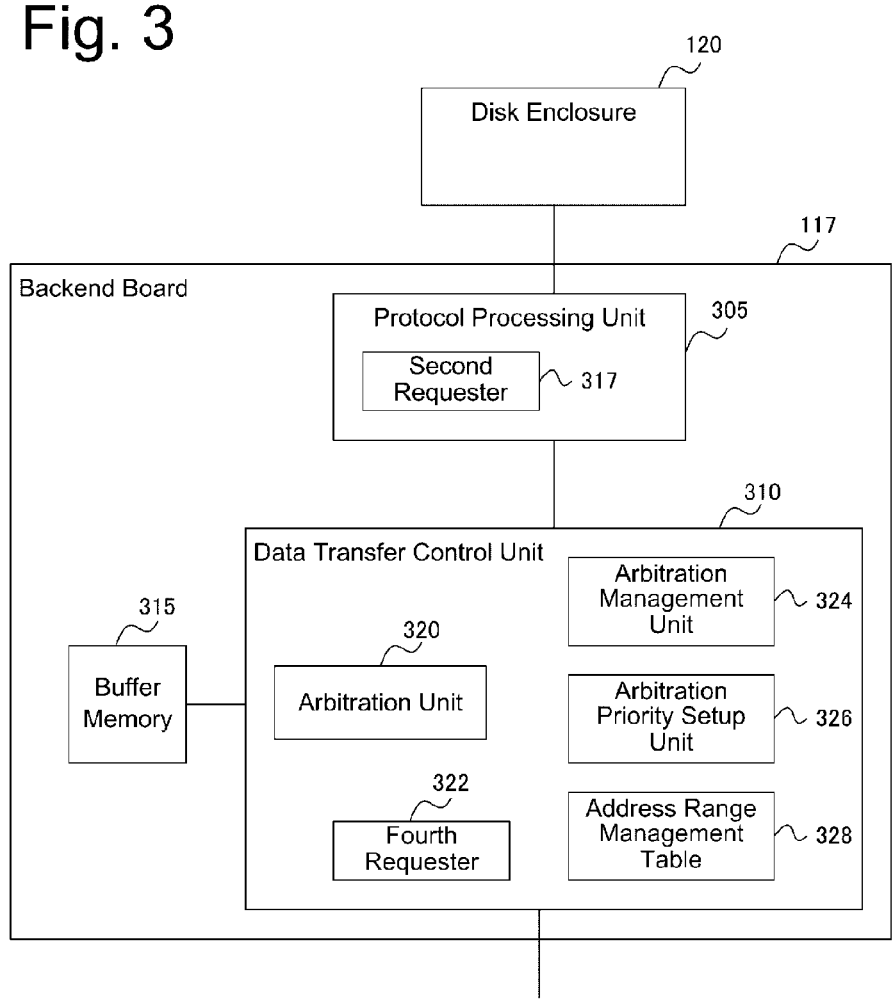
FIG. 3 is a block diagram showing a configuration of a backend board according to the first embodiment of the present invention.

FIG. 3 is a block diagram showing the configuration of a backend board according to the first embodiment. Next, the details of the backend board 117 will be described with reference to FIG. 3. The backend board 117 includes a protocol processing unit 305, a data transfer control unit 310 and a buffer memory 315.

The protocol processing unit 305 converts the protocol used for the communication between the disk enclosure 120 and the storage controller 115 to a protocol used within the storage controller 115.

The protocol used between the disk enclosure 120 and the storage controller 115 can be, for example, a Serial Attached SCSI (SAS) or a Fibre Channel (FC) which are standard protocols for coupling hard disks and other memory media.

The storage controller 115 is composed of multiple boards as shown in FIG. 1, and each board is often composed of multiple components as shown in FIG. 3. Therefore, the protocol used within the storage controller 115 should be suitable for communication among multiple boards or among components on the board, such as PCI-Express or Rapid-IO, which are computer bus standards.

The protocol processing unit 305 further includes a second requester 317. The second requester 317 reads the data being the target of the write request to the disk enclosure 120 from the buffer memory 315, or writes the data being the target of the read request from the disk enclosure to the buffer memory 315.

A data transfer control unit 310 reads from the buffer memory 315 the data being the target of the write request from the disk enclosure 120 to the memory board 118, and to transfer the same to the read memory board 118, or reads from the memory board 118 the data being the target of the read request from the disk enclosure 120, and transfers the same to the buffer memory 315.

The data transfer control unit 310 further includes an arbitration unit 320, a fourth requester 322, an arbitration management unit 324, an arbitration priority setup unit 326, and an address range management table 328.

The arbitration unit 320 arbitrates the accesses of the second requester 317 and the fourth requester 322 accessing the buffer memory 315.

The fourth requester 322 executes data transfer between the buffer memory 315 and the memory board 118. The fourth requester 322 enters the data stored in the buffer memory 315 to a given area on the memory board based on the data transfer parameter transferred from the processor 3210 in the processor board 119. Further, the fourth requester 322 reads the data stored in the cache memory area of the memory board 118 based on the data transfer parameter, and stores the same in a given area of the buffer memory 315. One example of the actual component of the fourth requester 322 is a DMA engine (DMA controller).

The arbitration management unit 324 controls the order of accesses of the second requester 317 and the fourth requester 322 based on the contents of the address range management table 328.

The arbitration priority setup unit 326 sets up the requester to be prioritized with respect to the arbitration unit 320 based on the contents of the arbitration setup received from the control program.

The address range management table 328 records the access destination start address and the access data length of data transfer performed with respect to the buffer memory 315.

Figure 4:
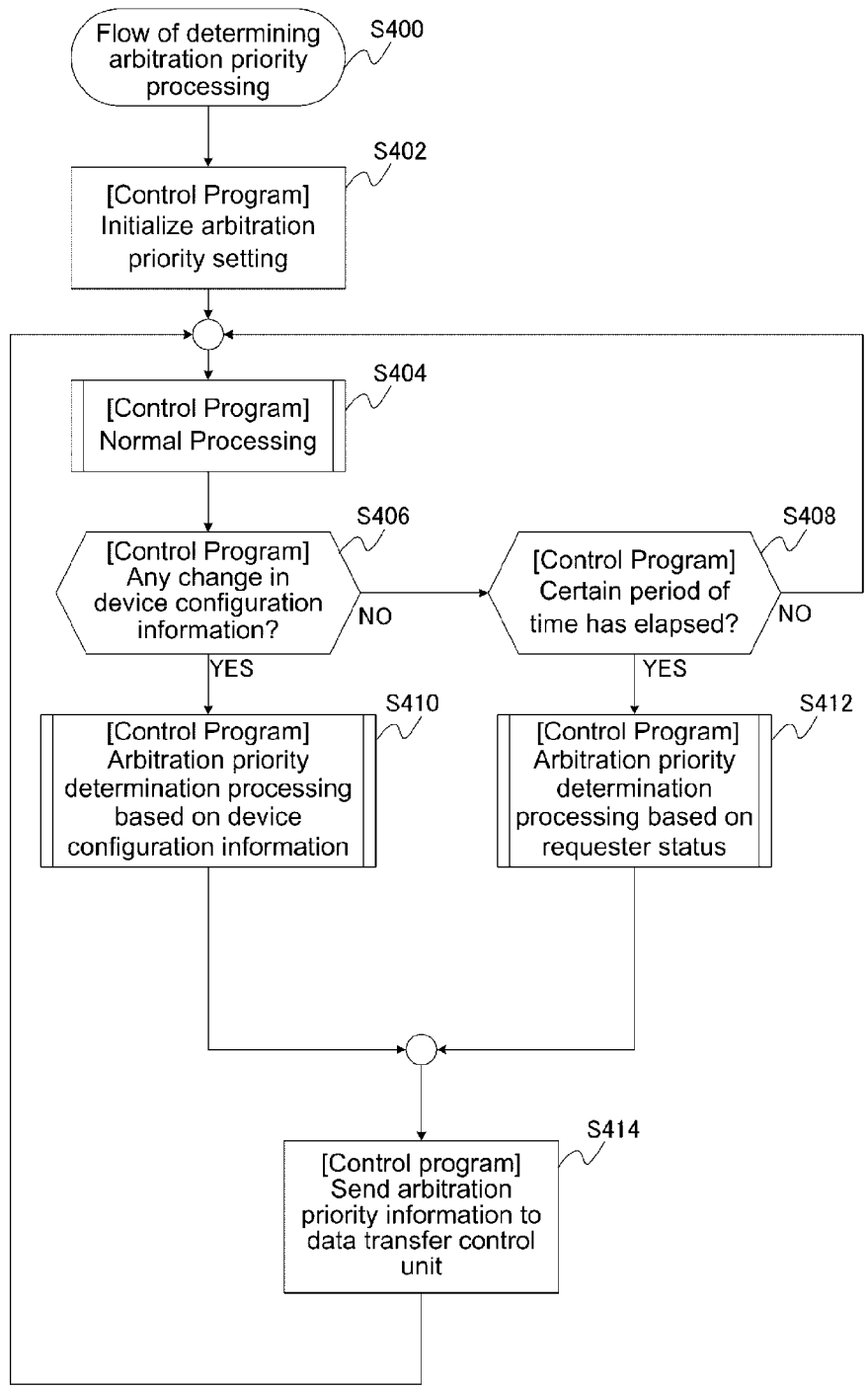
FIG. 4 is a flowchart of the process for determining the arbitration priority according to the first embodiment of the present invention.

FIG. 4 is a flowchart of the determination of arbitration priority processing according to the first embodiment of the present invention. Next, the flowchart S400 of the determination of arbitration priority processing according to the first embodiment of the present invention will be described with reference to FIG. 4.

The flowchart S400 of the determination of arbitration priority processing shown in FIG. 4 is performed by a control program operating in a processor 3210.

At first, the control program initializes the arbitration priority setting (S402). In this step, the control program is set to round-robin mode, for example, providing access rights equally to requesters accessing the buffer memory.

Thereafter, the control program enters normal processing (S404). Normal processing refers for example to a process performed in response to a command received from the host computer 105 or a process for controlling the interior of the storage controller 115. The control program performs, in response a command received from the host computer 105, generation of data transfer parameter for each requester for accessing the buffer memory of a frontend board 116 and a backend board 117, starting of data transfer, or detection of end of data transfer.

The control program checks whether there is any change in the configuration information of the storage controller 115 (S406). The configuration information of the storage controller 115 refers for example to the number of the frontend boards 116 or the backend boards 117.

The reason for focusing on the number of the frontend boards 116 or the backend boards 117 is as follows.

Basically, the amount of data in the host computer 105 processed by the storage controller 115 and the amount of data in the disk enclosure 120 are 1:1.

Now, if the number of the frontend boards 116 is equal to the number of the backend boards 117, the loads applied on the respective boards during data transfer are the same. However, if the number of the frontend boards 116 and the number of the backend boards 117 differ, the loads applied on the respective boards will be biased.

For example, if there are four frontend boards 116 and two backend boards 117, the load applied on the backend board 117 during data transfer will be double the load applied on the frontend board 116. That is, in that case, the backend board 117 will become the bottleneck of the performance of the storage controller 115, so that in order to improve the performance of the device, it is necessary to enhance the efficiency of data transfer regarding the backend board 117.

Therefore, if there are any changes in the configuration information of the storage controller 115 in step S406 (YES), the control program executes an arbitration priority determination processing based on device configuration information (S410). The details of the arbitration priority determination processing based on device configuration information will be described later.

If there is no change in the configuration information of the storage controller 115 in step S406 (NO), the control program advances to step S408.

The control program checks whether a predetermined period of time has elapsed or not in step S408. During this step, the control program is not just waiting for a given period of time to elapse, but actually, perform the process corresponding to the normal process of step S404.

When a given period of time has elapsed (S408: YES), the control program executes an arbitration priority determination processing based on the requester status (S412). The arbitration priority determination processing based on the requester status will be described in detail later.

The control program sends the arbitration priority information determined in step S410 or S412 to the data transfer control unit 210 or 310 of the frontend board 116 and the backend board 117 (S414), and returns to normal processing (S404). By the processes described above, it becomes possible to determine the arbitration priority according to the device configuration information or the requester status. In the description, the frontend board 116 and the backend board 117 are taken as examples, but the arbitration priority determination processing according to the present invention can be applied to a combination of the frontend board 116 and the processor board 119, or the backend board 117 and the processor board 119.

Figure 5:
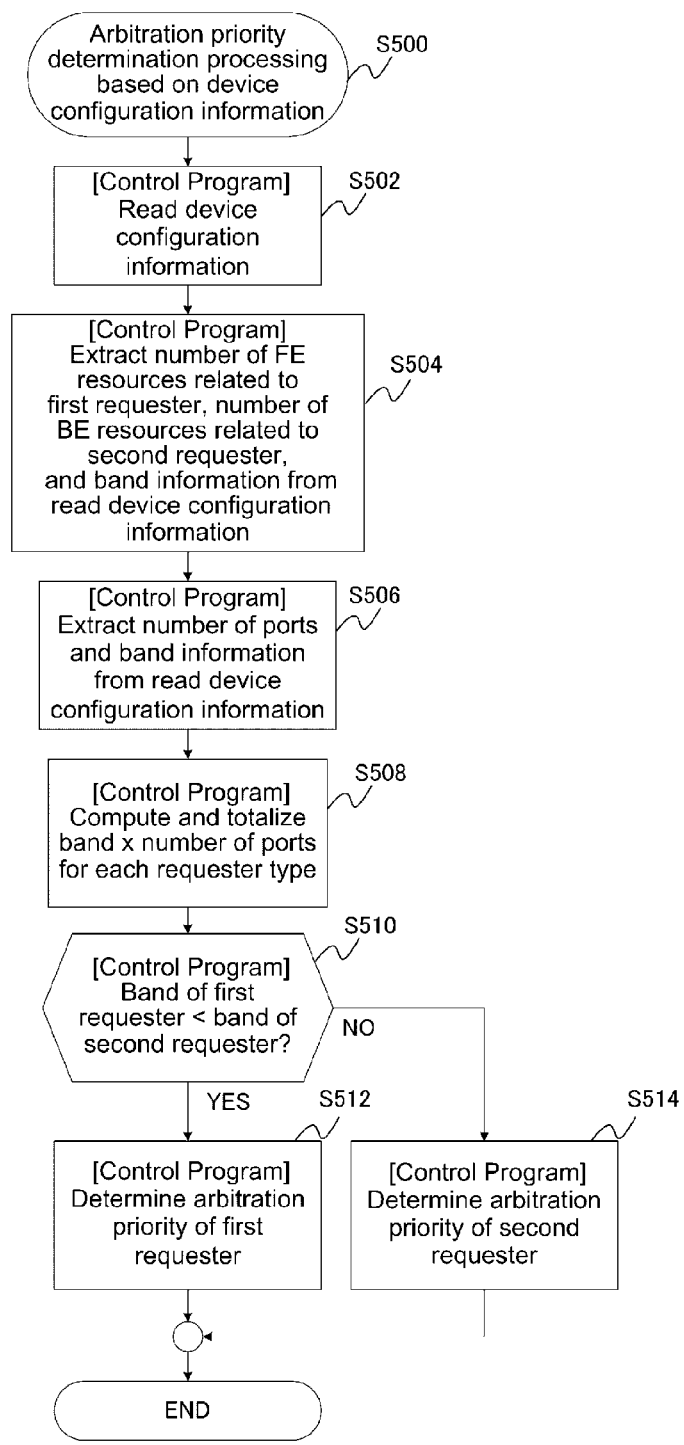
FIG. 5 is a flowchart of the process for determining the arbitration priority based on a device configuration information according to the first embodiment of the present invention.

FIG. 5 is a flowchart of the arbitration priority determination processing via device configuration information according to the first embodiment of the present invention. Next, the flowchart of an arbitration priority determination processing 500 based on the device configuration information will be described with reference to FIG. 5.

At first, the control program reads the configuration information of the storage controller 115 (S502). A management terminal 150 in the storage system 100 illustrated in FIG. 1 writes the configuration information of the storage controller 115 in a given area of the storage controller 115. The control program reads the configuration information from the given area to which data is written by the management terminal 150.

Next, the control program extracts, from the read configuration information, a number of FE (frontend) resources related to a first requester, a number of BE (backend) resources related to a second requester, and a band information (S504).

The control program extracts the number of ports and the band information from the read configuration information (S506).

The control program computes and totalizes the product of band and the number of ports for each requester type (S508). For example, if the number of ports related to the first requester 217 is 16 and the band per each port is 8 Gbps (Giga bit per second), the band of the first requester will be 128 Gbps. Further, if the number of ports related to the second requester 317 is 16 and the band per each port is 12 Gbps, the band of the second requester will be 192 Gbps. In other words, the processing ability of the first requester will be lower than the processing ability of the second requester.

The control program compares the bands of the first requester and the second requester (S510). According to the above example, the band of the first requester is 128 Gbps and the band of the second requester is 192 Gbps, so that the first requester is smaller than the second requester. Therefore, in this case, the condition of step S510 is satisfied, so the procedure advances to step S512.

The control program determines the arbitration priority of the first requester (S512). As described, basically the data quantity of the host computer 105 processed by the storage controller 115 and the data quantity of the disk enclosure 120 are 1:1. As shown in FIG. 2, the transfer of data between the host computer 105 and the frontend board 116 is processed by the first requester. As illustrated in FIG. 3, the transfer of data between the disk enclosure 120 and the backend board 117 is processed by the second requester.

Therefore, the load related to data transfer is higher in the first requester than the second requester, so that the efficiency of data transfer of the first requester must be enhanced. Therefore, arbitration control is executed to prioritize accesses to the buffer memory from the first requester. Due to this arbitration priority control, the data transfer efficiency of the first requester can be improved, and the processing performance of the storage system can also be improved.

The control program compares the bands of the first requester and the second requester, and if the first requester is greater than the second request, the procedure advances to step S514. In this case, the control program executes arbitration control so as to prioritize the accesses to the buffer memory by the second requester (S514). The reason is the same as that described with reference to the first requester.

Figure 6:
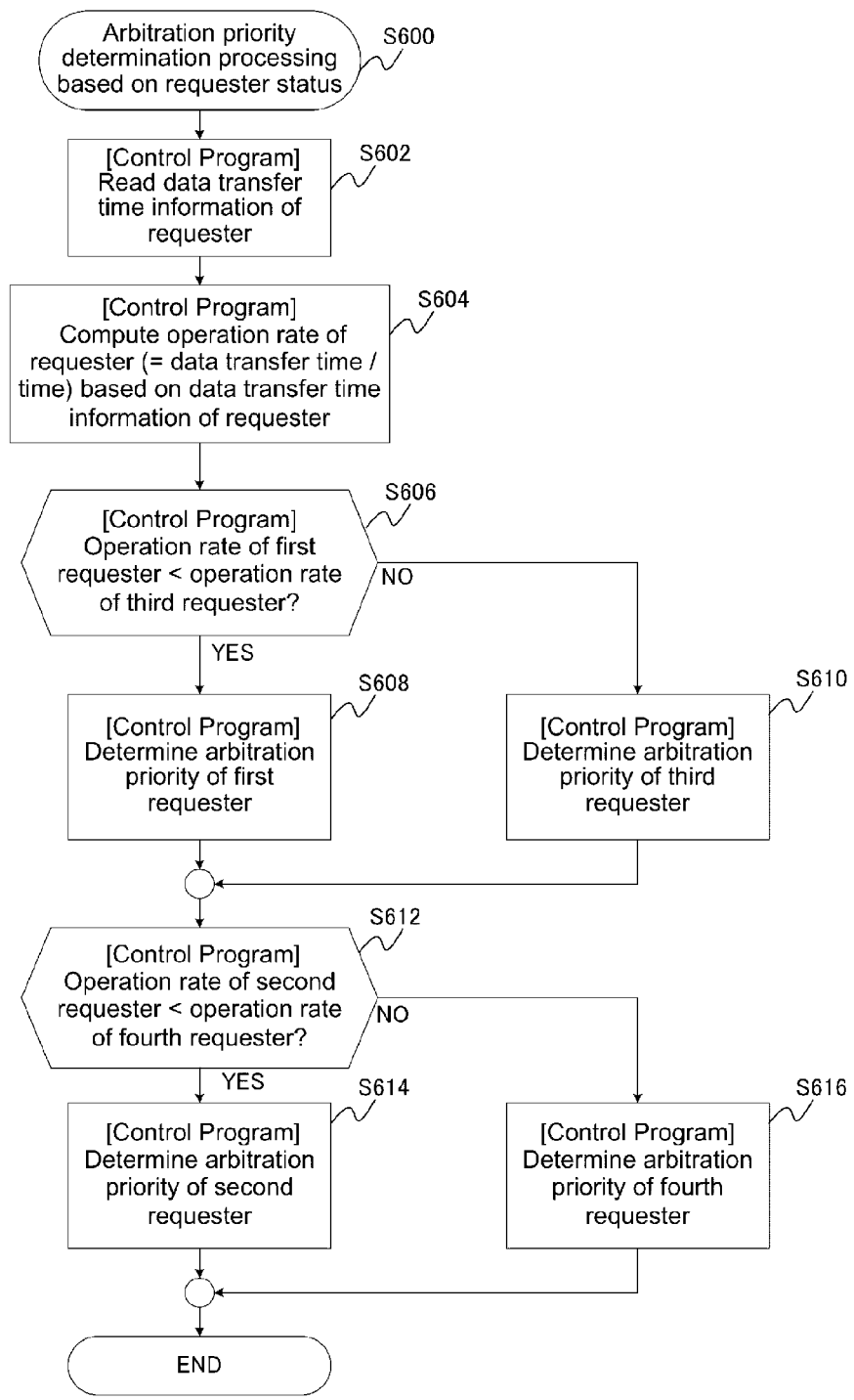
FIG. 6 is a flowchart of the process for determining the arbitration priority based on a requester status according to the first embodiment of the present invention.

FIG. 6 is a flowchart of the arbitration priority determination processing based on a requester status according to the first embodiment of the present invention. Next, we will describe the flowchart of the arbitration priority determination processing S600 based on a requester status with reference to FIG. 6.

At first, the control program reads a data transfer time information of the requester (S602).

Next, the control program computes the operation rate of the requester based on the data transfer time information of the requester. Actually, the value obtained by dividing the data transfer time by unit time is set as the operation rate of the requester. Thereby, the time that a requester actually spends for data transmission, that is, the operation rate of the requester for data transmission can be acquired.

The control program compares the operation rates of the first requester 217 and the third requester (S606). If the operation rate of the first requester 217 is lower than the operation rate of the third requester 222 (YES), the procedure advances to step S608, and if it is higher (NO), the procedure advances to step S610.

In step S608, the control program determines the arbitration priority of the first requester 217 (S608). The meaning of the operation rate of the first requester 217 being lower than that of the third requester 222 is that the data transfer efficiency of the first requester 217 has not been improved due to some reason. One such reason is the ratio occupied by the processing time other than the data transfer time being high. A possible processing time other than the data transfer time is a standby time due to competition of accesses with data transmission from other requesters. In order to solve the problem of such standby time, it is necessary to change the arbitration in the buffer memory 215 so as to prioritize the access of the first requester 217 over the access of the third requester 222.

In contrast, if the operation rate of the first requester 217 is higher than the third requester 222, it means that the data transfer efficiency of the third requester 222 has not been raised. Thus, the control program changes the arbitration in the buffer memory 215 so as to prioritize the access of the third requester 222 over the first requester 217 (S610).

Next, the control program compares the operation rates of the second requester 317 and the fourth requester 322 (S612). If the operation rate of the second requester 317 is lower than that of the fourth requester 322 (YES), the procedure advances to step S614, and if it is higher (NO), the procedure advances to step S616.

In step S612, the control program determines the arbitration priority of the second requester 317 (S614). The meaning of the operation rate of the second requester 317 being lower than the operation rate of the fourth requester 322 is that the data transfer efficiency of the second requester 317 has not been improved due to some reason. One such reason is the ratio occupied by the processing time other than the data transfer time being high.

A possible processing time other than the data transfer time is the standby time due to competition of accesses with data transmission from other requesters. In order to solve such standby time, it is necessary to change the arbitration in the buffer memory 325 so as to prioritize the access of the second requester 317 over the access of the fourth requester 322.

In contrast, if the operation rate of the second requester 317 is higher than the fourth requester 322, it means that the data transfer efficiency of the fourth requester 322 has not been improved. Thus, the control program changes the arbitration in the buffer memory 325 so as to prioritize the access of the fourth requester 322 over the second requester 317 (S616).

As described, by performing arbitration priority control of each buffer memory using factors such as a requester operation rate (=data transfer time/unit time) or non-operation rate (=standby time/unit time), it becomes possible to enhance the data transfer efficiency, and to improve the processing performance of the storage system.

Figure 7:
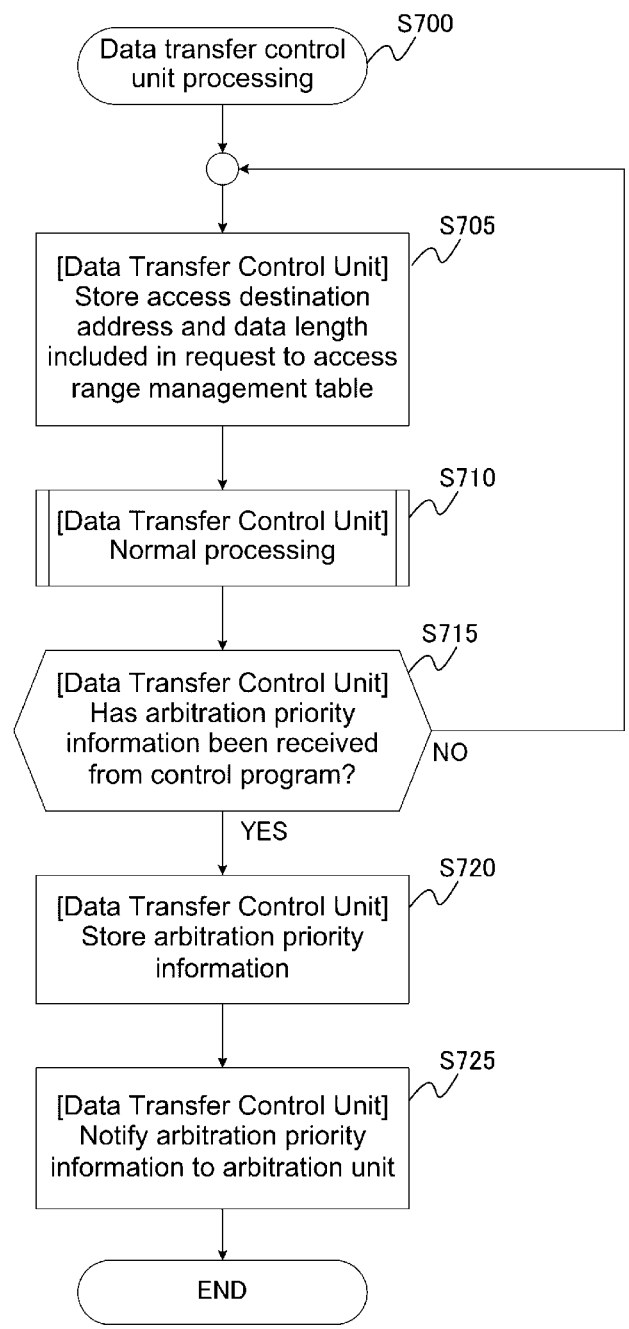
FIG. 7 is a flowchart of the process performed by a data transfer control unit according to the first embodiment of the present invention.

FIG. 7 is a flowchart of the process in the data transfer control unit according to the first embodiment of the present invention. Next, the process of the data transfer control unit 210/310 will be described with reference to FIG. 7.

The data transfer control unit extracts the access destination address and the data length included in the request issued by the requester, records the same in an access range management table 1500 (FIG. 14) (S705), and executes normal processing (S710). Normal processing refers to data transfer processing of data to the buffer memory or the memory on the memory board.

The data transfer control unit confirms whether an arbitration priority information has been received from the control program or not (S715). If the information has been received (YES), the data transfer control unit stores the arbitration priority information in the arbitration priority setup unit (S720). If the information has not been received (NO), the procedure returns to step S705.

The data transfer control unit notifies the arbitration priority information to the arbitration unit (S725).

Figure 8:
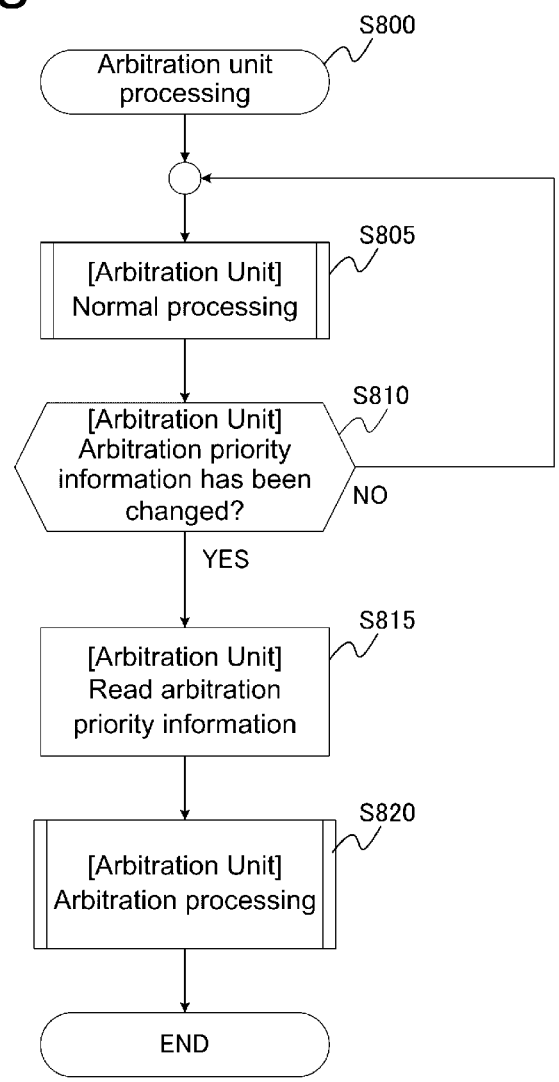
FIG. 8 is a flowchart of the process performed by an arbitration unit according to the first embodiment of the present invention.

FIG. 8 is a flowchart of the process performed in an arbitration unit according to the first embodiment of the present invention. Next, the process performed in the arbitration unit 220/320 will be described with reference to FIG. 8.

The arbitration unit performs normal processing (S805). Normal processing refers to performing arbitration of accesses of the requester according to the arbitration priority information.

Next, the arbitration unit confirms whether the arbitration priority information has been changed or not (S810). The arbitration priority information is notified from the data transfer control unit, wherein if change has occurred (YES), the procedure advances to step S815, and if not (NO), the procedure returns to step S805.

In step S815, the arbitration unit reads the arbitration priority information from an arbitration priority setup unit 226/326, and performs an arbitration processing (S820). By the above processing, when change has occurred to the processing ability of the requester, the arbitration priority control of the requester can be changed dynamically according to the contents of change.

Figure 9A:
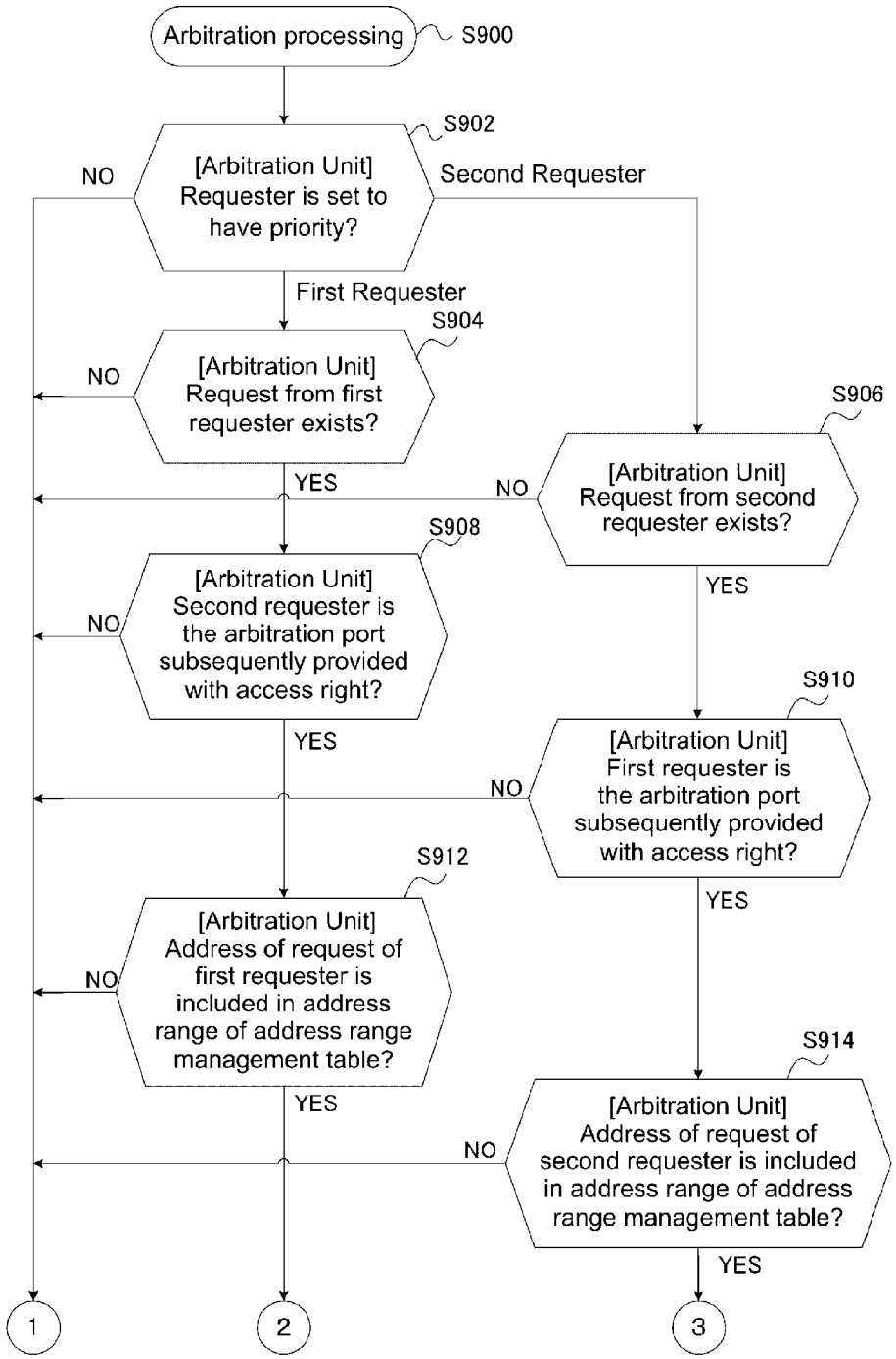
FIG. 9A is a flowchart of the arbitration processing according to the first embodiment of the present invention.
Figure 9B:
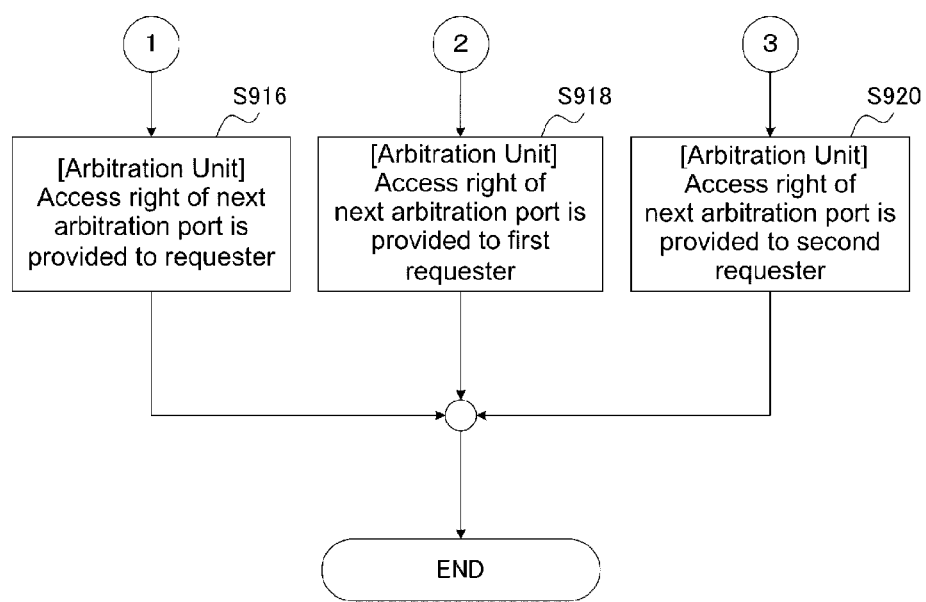
FIG. 9B is a flowchart of the arbitration processing according to the first embodiment of the present invention.

FIGS. 9A and 9B are flowcharts of the arbitration processing according to the first embodiment of the present invention. Next, the arbitration processing will be described with reference to FIGS. 9A and 9B.

The arbitration unit confirms the requester set to have priority according to the arbitration priority information set up in the arbitration priority setup unit (S902).

In step S902, if the first requester is set to have priority, the procedure advances to step S904, if the second requester is set to have priority, the procedure advances to step S906, and if no priority is set, the procedure advances to step S916 of FIG. 9B.

If the first requester is set to have priority, the arbitration unit confirms whether there is a request from the first requester (S904). If a request from the first requester exists, the procedure advances to step S908, and if not, the procedure advances to step S916 of FIG. 9B.

If a request from the first requester exists, the arbitration unit confirms whether the subsequently provided access right is provided to the second requester or not (S908), wherein if yes, the procedure advances to step S912, and if no, the procedure advances to step S916 of FIG. 9B.

If the subsequently provided access right is provided to the second requester, the arbitration unit confirms whether the address of the request of the first requester is included in the address range of the address range management table (S912), wherein if yes, the procedure advances to step S918 of FIG. 9B, and if no, the procedure advances to step S916 of FIG. 9B.

If the address of the request of the first requester is included in the address range of the address range management table, the arbitration unit provides the next access right to the first requester (S918).

On the other hand, if the second requester is set to have priority, the arbitration unit confirms whether there is a request from the second requester (S906). If there is a request from the second requester, the procedure advances to step S910, and if not, the procedure advances to step S916 of FIG. 9B.

If a request from the second requester exists, the arbitration unit confirms whether the subsequently provided access right is provided to the first request or not (S910), wherein if yes, the procedure advances to step S914, and if no, the procedure advances to step S916 of FIG. 9B.

If the subsequently provided access right is provided to the first requester, the arbitration unit confirms whether the address of the request of the second requester is included in the address range of the address range management table (S914), wherein if included, the procedure advances to step S920 of FIG. 9B, and if not, the procedure advances to step S916 of FIG. 9B.

If the address of the request of the second requester is included in the address range of the address range management table, the arbitration unit provides the subsequent access right to the second requester (S920).

If arbitration priority has not been set up in step S916, the arbitration unit provides an access right of the subsequent arbitration port to the requester according to a given algorithm. For example, in the case of a round-robin algorithm, the access right is provided to the next requester.

In step S918, the arbitration unit provides an access right of the next arbitration port to the first requester. In step S920, the arbitration unit provides the access right to the next arbitration port to the second requester.

According to the above processing, the arbitration unit is capable of performing control so as to prioritize the arbitration of the requester to which the next access right is provided.

Figure 10:
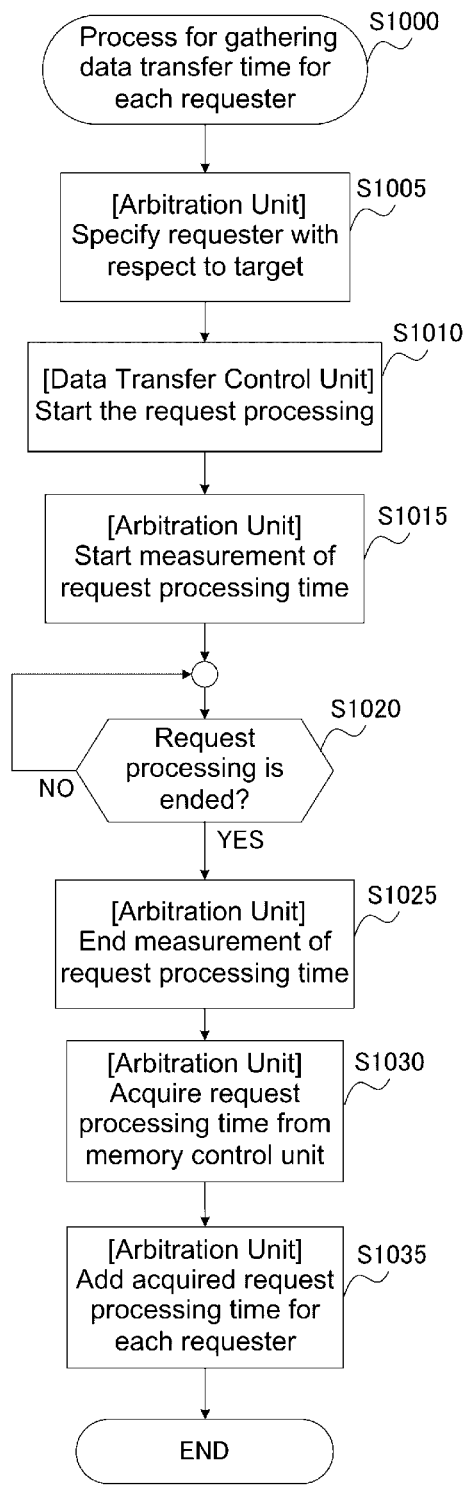
FIG. 10 is a flowchart of the process for gathering data transfer time for each requester according to the first embodiment of the present invention.

FIG. 10 is a flowchart of the process for gathering the data transfer time of each requester according to the first embodiment of the present invention. Next, the process for gathering the data transfer time of the requester will be described with reference to FIG. 10.

The arbitration unit specifies the requester corresponding to the target (S1005). Thereafter, the data transfer control unit starts processing the request (S1010).

The arbitration unit starts measurement of the processing time regarding the processing of the request (S1015).

When the processing of the request is completed (S1020), the arbitration unit ends the measurement of the processing time of the request (S1025).

The arbitration unit acquires the processing time of the request from the data transfer control unit (S1030), and adds the acquired processing time for each requester (S1035). The above-described process is performed for each request. As described, based on the processing time including the data transfer time collected for each request, the control program computes the operation rate of each requester, so as to determine the arbitration priority of the requester.

Figure 11:
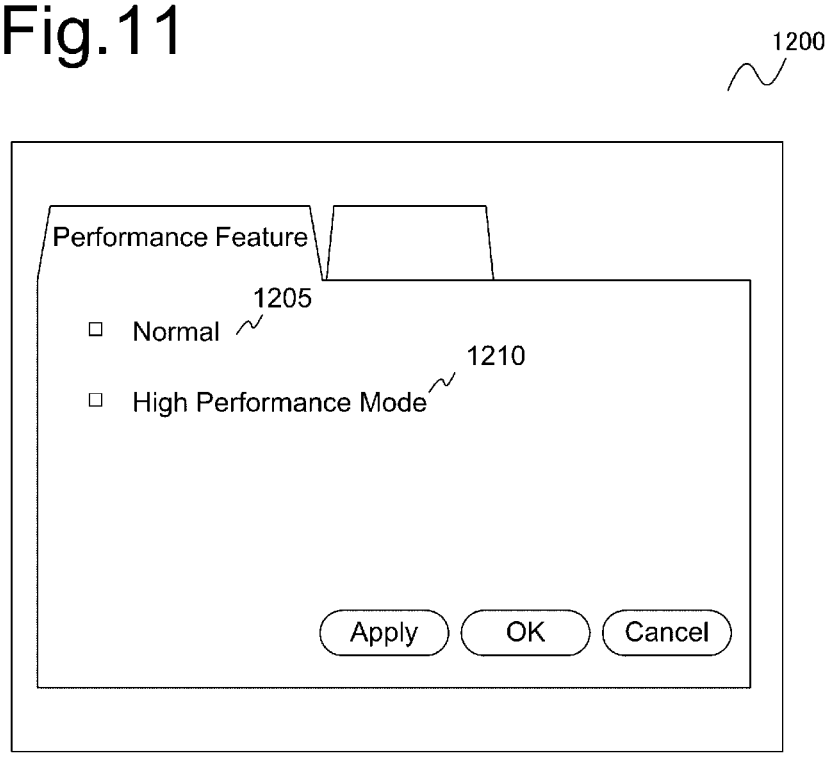
FIG. 11 is a view showing the management screen according to the first embodiment of the present invention.

FIG. 11 is a view illustrating the management screen of the first embodiment of the present invention. Next, a management screen 1200 of a management terminal 150 managing the storage system will be described with reference to FIG. 11. The prior art mode not having the present invention applied is called a normal mode 1205, and the mode applying the present invention is called a high performance mode 1210.

Figure 12:
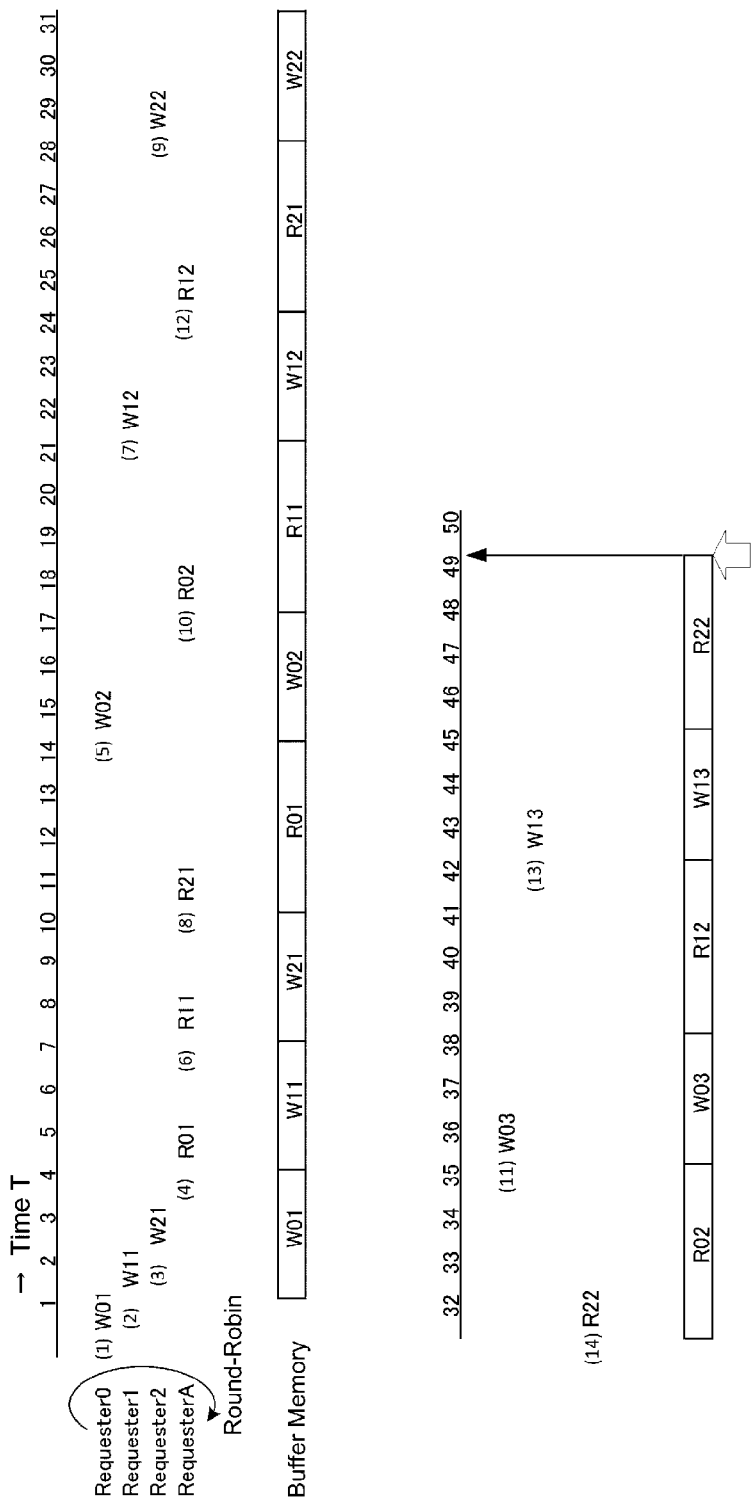
FIG. 12 is a view showing the flow of processing according to a prior art buffer memory.

FIG. 12 is a view showing the flow of processing according to a prior art buffer memory. The prior art flow of the processing in a buffer memory will be described with reference to FIG. 12.

In FIG. 12, Requesters 0, 1 and 2 are a third requester, and Requester A is a first requester. Further, Wxx in FIG. 12 indicates a write request, and Rxx indicates a read request. The numbers shown within brackets indicate the orders of requests processed via the buffer memory.

In FIG. 12, it is assumed that after data is written into the buffer memory via the write requests issued by Requesters 0, 1 and 2, the data written into the buffer memory is read by the read request issued from the Requester A, and the data is transmitted to the host computer. The access arbitration in the buffer memory is set to round-robin algorithm. In other words, access rights are provided in the named order to Requester 0, 1, 2, A, 0, 1, and so on.

In FIG. 12, write requests of W01, W11 and W21 are issued in said order from the Requesters 0, 1 and 2, respectively (time T=3). Thereafter, write processing is performed to the buffer memory in the named order of W01, W11 and W21 (T=10). After the write request W01 in the buffer memory has been completed (T=4), a read request R01 is issued from the Requester A (T=5).

However, the read request of R01 is not immediately processed in the buffer memory, but is processed (T=14) after processing the write request of W11 having an access right (T=7) and the write request W21 (T=10). Thereafter, when the write request Wxx is ended, the read request Rxx is issued, and the same sequence is repeated. At last, at time T=49, the processing of read request R22 (T=32) corresponding to W22 (T=14) issued by Requester 2 is ended.

Figure 13:
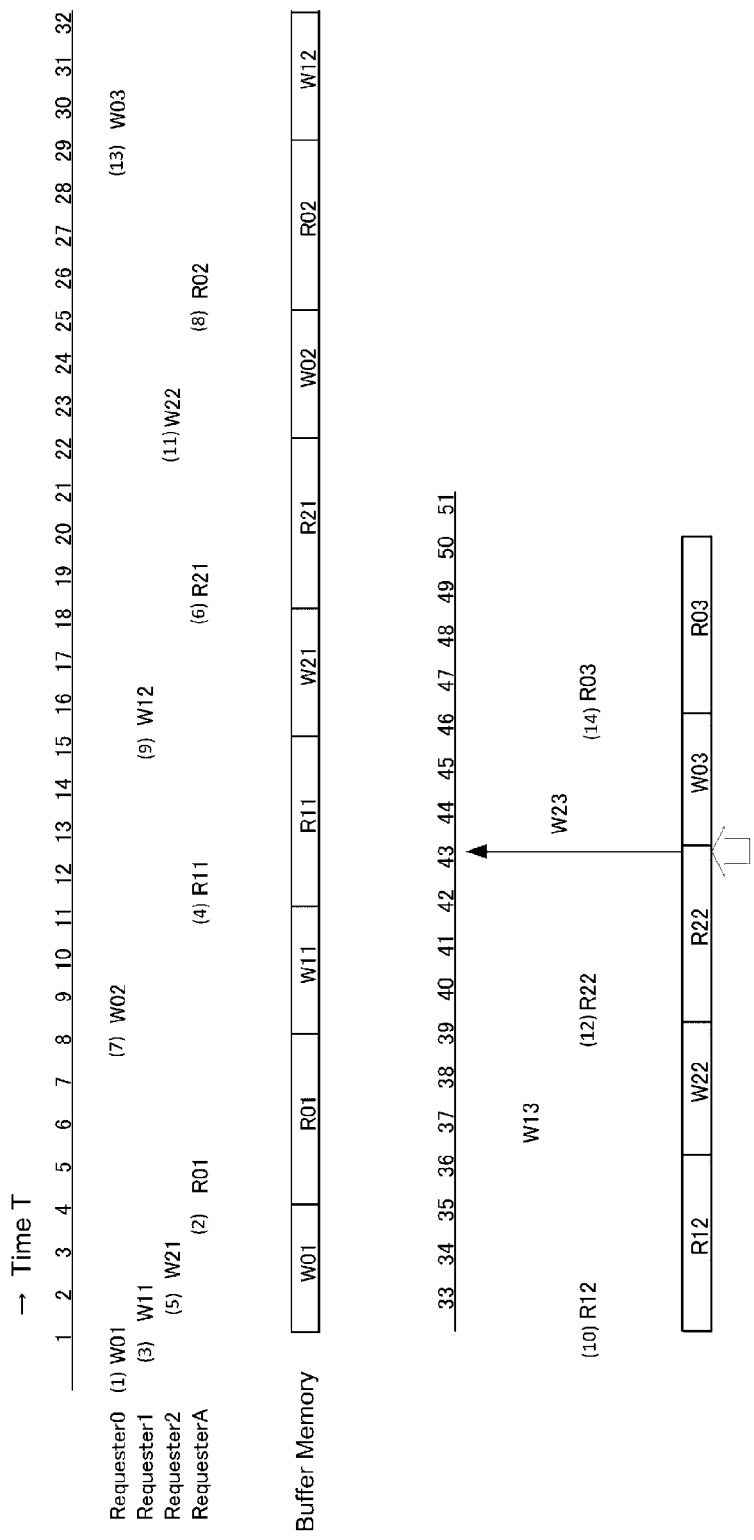
FIG. 13 is a view showing the flow of processing in a buffer memory according to the first embodiment of the present invention.

FIG. 13 is a view showing the flow of processing performed by the buffer memory according to the first embodiment of the present invention. In contrast to FIG. 12, the flow of the processing in the buffer memory to which the present invention is applied will be described with reference to FIG. 13.

The difference between FIG. 13 and FIG. 12 is the process performed after the buffer memory processes the write request W01 issued by Requester 0.

In FIG. 12, the write request W11 has been processed according to the round-robin algorithm. In FIG. 13, control is performed to process the read request R01 issued by Requester A. According to this operation, the storage controller 115 can send the data having been read by read request R01 to the host computer 105 faster than the prior art (advanced to T=8 of FIG. 13 from time T=14 of FIG. 12). Since one I/O is ended, the host computer can issue the next I/O. In other words, the number of I/Os capable of being issued and processed per unit time is increased compared to FIG. 12, and the performance of the storage system can be improved.

As a result, the read request R22 corresponding to W22 issued by Requester 2 is ended at time T=43, so that the process can be completed at an earlier time than the prior art time T=49 shown in FIG. 12. That is, the number of I/Os that can be issued and processed per unit time is increased, and as a result, the storage system performance can be improved.

Figures 14, 15:
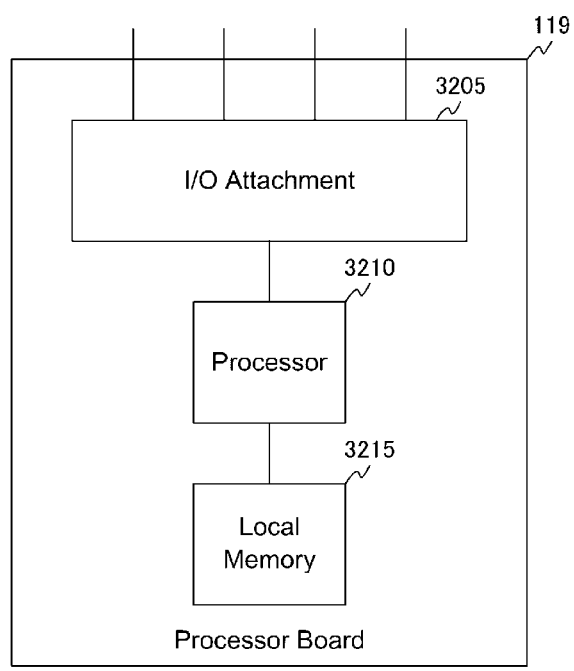
FIG. 14 is a view showing one example of the address range management table according to the first embodiment of the present invention.
FIG. 15 is a block diagram showing the configuration of a processor board according to the first embodiment of the present invention.

FIG. 14 is a view showing one example of an address range management table according to the first embodiment of the present invention. Next, address range management table 1500 will be described with reference to FIG. 14.

The address range management table 1500 includes a start address 1510 field and a data length 1520 field.

The start address 1510 field shows a beginning address of the storage destination of data being read from or written to the buffer memory.

The data length 1520 field shows the data length accessing the buffer memory.

That is, the range in which the requester accesses the buffer memory can be recognized by the start address 1510 and the data length 1520. This information is effective in the following case. Actually, the case refers to an example where the access unit of the first requester with respect to the buffer memory differs from the access unit of the third requester with respect to the buffer memory. Similarly, the case refers to an example where the access unit of the second requester with respect to the buffer memory differs from the access unit of the fourth requester with respect to the buffer memory.

For example, it is assumed that the access unit of the first requester with respect to the buffer memory is 1024 Bytes, and the access unit of the third requester is 2048 Bytes. Furthermore, it is assumed that the access destinations of the requests of the first requester and the third requester are the same.

At first, if the start address of the initial request is address 10000000, then in the next request, the first requester accesses from address 10001024. When determination is performed simply via address, address 10001024 does not hit the entry of the field of the start address 1510 of the address range management table 1500, so that it is not possible to apply the arbitration priority processing. Therefore, by taking into consideration the data length as the access range, it becomes possible to apply the arbitration priority processing.

FIG. 15 is a block diagram illustrating the configuration of a processor board according to a first embodiment of the present invention. Next, the details of a processor board 119 will be described with reference to FIG. 15. The processor board 119 includes an I/O attachment 3205, a processor 3210, and a local memory 3215.

The I/O attachment 3205 is a unit for attaching the processor 3210 to other circumference devices. The processor 3210 controls the storage controller 115. For example, in order to refer to and update the control data, the configuration data and the directory data of the storage system, the processor 3210 accesses the system area of the memory storing these information.

Furthermore, regarding the data received from the host computer 105, the processor 3210 transmits a data transfer parameter to a third requester (such as a DMA engine) within the data transfer control unit 210 of the frontend board 116, and performs transfer of data to the memory board 118.

Further, the processor 3210 monitors failure of the storage controller 115 or the disk enclosure 120, and when failure is detected, executes processing to cope with the failure.

The local memory 3215 stores data handled by the processor 3210, the programs executed by the processor 3210, and so on.

Figure 16:
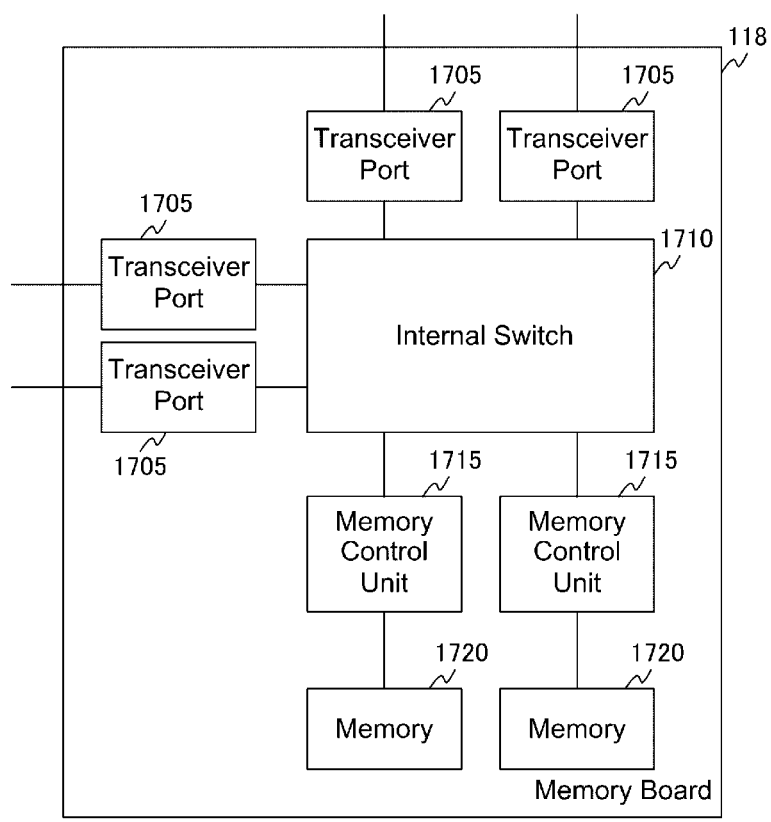
FIG. 16 is a block diagram illustrating the configuration of a memory board according to the first embodiment of the present invention.

FIG. 16 is a block diagram illustrating the configuration of a memory board according to a first embodiment of the present invention.

The details of a memory board 118 will be described with reference to FIG. 16. The memory board 118 includes a transceiver port 1705, an internal switch 1710, a memory control unit 1715 and a memory 1720.

The transceiver port 1705 has a signal processing function corresponding to a physical layer or a data link layer in an OSI (Open Systems Interconnection) reference model.

The internal switch 1710 couples the component units of the storage controller 115 other than the memory board 118 (the frontend board 116, the backend board 117 and the processor board 119) and the memory control unit 1715, and relays communication among these component units.

The memory control unit 1715 interprets the packets received from the frontend board 116 etc., and controls the reading and writing of data from/to the memory 1720.

The memory 1720 stores, for example, data communicated with the host computer 105 or with the disk enclosure 120 temporarily, or stores the control information necessary for performing control within the storage controller 115.

The present invention is not restricted to the preferred embodiments described above, and can include various modifications. For example, according to the above embodiment, the requester issuing the access to the memory on the memory board is the DMA engine, but the requester is not restricted thereto. For example, as shown in FIG. 1, a processor board is also coupled to the memory board. The processor board has a processor mounted thereon. The processor accesses the system area of the memory on the memory board storing data such as the control data, the configuration data and the directory data of the storage system. In other words, the processor can also be the requester issuing the access to the memory on the memory board.

The above-illustrated embodiments are mere examples for describing the present invention in detail, and they are not intended to restrict the present invention to include all the components illustrated above. Further, a portion of the configuration of an embodiment can be replaced with the configuration of another embodiment, or the configuration of a certain embodiment can be added to the configuration of another embodiment. Moreover, a portion of the configuration of each embodiment can be added to, deleted from or replaced with other configurations.

Furthermore, a portion or whole of the above-illustrated configurations, functions, processing units, processing means and so on can be realized via a hardware configuration such as by designing an integrated circuit. Further, the configurations and functions illustrated above can be realized via software by the processor interpreting and executing programs realizing the respective functions.

The information such as the programs, tables and files for realizing the respective functions can be stored in a storage device such as a memory, a hard disk or a SSD (Solid State Drive), or in a memory media such as an IC card, an SD card or a DVD.

Further, only the control lines and information lines considered necessary for description are illustrated in the drawings, and not necessarily all the control lines and information lines required for production are illustrated. In actual application, almost all the configurations are mutually coupled.

REFERENCE SIGNS LIST

100 Computer System
105 Host Computer
110 Network (SAN)
115 Storage Controller
116 Frontend Board
117 Backend Board
118 Memory Board
119 Processor Board
120 Disk Enclosure
125 Storage Device
215, 315 Buffer Memory
217 First Requester
222 Third Requester
226, 326 Arbitration Priority Setup Unit
228, 328 Address Range Management Table
317 Second Requester
322 Fourth Requester

The invention claimed is:

1. A storage system coupled to a host computer, the storage system comprising:
  a disk unit configured to store data requested to be written from the host computer to the disk unit and store data requested to be read from the disk unit to the host computer; and
  a storage controller configured to control the disk unit, the storage controller comprising:
    (A) a memory unit configured to store data communicated with the host computer, control information of the storage controller, and data communicated with the disk unit;
    (B) one or more host interface units each in communication with the host computer and the memory unit, each of the one or more host interface units comprising:
      (i) a host interface buffer memory,
      (ii) a first requester configured to transfer the data between the host computer and the host interface buffer memory; and
    (C) one or more disk interface units each in communication with the disk unit and the memory unit, each of the one or more disk interface units comprising:
      (i) a disc interface buffer memory,
      (ii) a second requester configured to transfer the data between the host computer and the disc interface buffer memory; and
    (D) a processor for controlling the storage controller, wherein when a first data transfer access request from the first requester of the one or more host interface units to the memory unit competes with a second data transfer access request from the second requester of the one or more disk interface units, the storage controller is configured to:
      determine when a change occurs in at least one of: (i) a number of host interface units available for transfer of the data; and (ii) a number of disk interface units available for transfer of the data; and
      execute a first priority control when there is a change in the at least one of: (i) the number of host interface units available for transfer of the data; and (ii) the number of disk interface units available for transfer of the data, the first priority control comprising comparing a processing performance of the first requester with a processing performance of the second requester, and the access request to the memory unit from the one of the first requester and the second requester having a lower processing performance is started in a prioritized manner.

2. The storage system according to claim 1, wherein the one or more host interface units each comprise a third requester configured to transfer the data between the host interface buffer memory and the memory unit and the one or more disc interface units each comprise a fourth requester configured to transfer the data between the disc interface buffer memory and the memory unit, and
  when there is no change in the least one of the number of: (i) host interface units available for transfer of the data; and (ii) disk interface units available for transfer of the data and when a predetermined amount of time has elapsed, the storage controller is further configured to:
    determine an operation rate for each of the first second, third and fourth requesters based on a transfer time per unit time of the corresponding requester; and
    execute a second priority control in which the operation rate of the first requester is compared with the operation rate of the third requester, and the access request to the memory unit from the one of the first requester and the third requester having a lower operation rate is started in a prioritized manner;
    after the second priority control is executed, execute a third priority control in which the operation rate of the second requester is compared with the operation rate of the fourth requester, and the access request to the memory unit from the one of the second requester and the fourth requester having a lower operation rate is started in a prioritized manner.

3. The storage system according to claim 2, wherein
  each of the one or more host interface units comprises a host interface controller in communication with the host computer, a first data transfer controller configured to transmit and receive the data with the memory unit;
  each of the one or more disk interface units comprises a disk interface controller in communication with the disk unit, a second data transfer controller configured to transmit and receive the data with the memory unit.

4. The storage system according to claim 3, wherein:
  the host interface controller comprises the first requester, and the first data transfer controller comprises the third requester and
  the disk interface controller comprises the second requester and the second data transfer controller comprises the fourth requester.

5. The storage system according to claim 1, wherein based on a storage system configuration information entered via a management terminal coupled to the storage system or based on a storage system configuration information stored in the storage system,
  data transfer performances and the number of the host interface units available for transfer of the data and disk interface units available for transfer of the data are acquired, and the processing performances are computed based on the data transfer performances and the number of host interface units, so as to perform priority control of the access requests.

6. The storage system according to claim 4, wherein based on a storage system configuration information entered via a management terminal coupled to the storage system or based on a storage system configuration information already stored in the storage system, data transfer performances and numbers of the host interface controllers, the first data transfer controllers, the disk interface controllers; and the second data transfer controllers are acquired, and the storage controller is configured to:

determine when a change occurs in at least one of: (i) the number of the host interface controllers; (ii) the number of the first data transfer controllers; (iii) the number of the disk interface controllers: and (ii) the number of the second data transfer controllers.

7. The storage system according to claim 1, wherein the disk unit is further configured to store data requested to be read from the disk unit to the host computer, and after a first write access request and a subsequent second write access request are issued from the host computer, if a read access request of write data based on the first write access request is issued from the host computer, the read access request is prioritized over the second write access request after completing the processing of the first write access request.

8. The storage system according to claim 1, wherein the system includes a start address and a data length designating a range in which the priority control is performed.

9. The storage system according to claim 1, wherein a priority control mode in which priority control of the access requests is performed and a normal control mode in which the priority control is not performed are selected via the management terminal.

10. The storage system according to claim 9, wherein if a request started in advance competes with a request that can be started only after completing the request started in advance, the arbitration of access requests is performed via normal control without performing the priority control.

11. An access arbitration method of a storage system, the method comprising:

receiving, from one or more host interface units in communication with a host computer and a storage unit, a first data transfer access to a storage unit;

receiving, from one or more disc interface units in communication with a disc unit and a storage unit, a second data transfer access request to the storage unit;

determining when a change occurs in at least one of: (i) a number of host interface units available for transfer of the data; and (ii) a number of disk interface units available for transfer of the data;

executing a priority control when there is a change in the at least one of the number of: (i) host interface units available for transfer of the data; and (ii) disk interface units available for transfer of the data by:

comparing a processing performance of the one or more host interface units with a processing performance of the one or more disc interface units and providing a priority access to the storage unit from the one of the requesting host interface unit and the requesting disc interface unit having a lower processing ability or a lower operation rate, so as to process multiple data transfer access requests simultaneously.

\* \* \* \* \*